United States Patent
Hagen (10) Patent No.: US 8,379,075 B2
(45) Date of Patent: Feb. 19, 2013

(54) METHOD, DEVICE, AND COMPUTER-READABLE MEDIUM FOR PROCESSING IMAGES DURING VIDEO CONFERENCING

(75) Inventor: Einar Andreas Hagen, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 690 days.

(21) Appl. No.: 12/575,226

(22) Filed: Oct. 7, 2009

(65) Prior Publication Data

US 2010/0091086 A1    Apr. 15, 2010

(30) Foreign Application Priority Data

Oct. 7, 2008    (NO) .................................. 20084201

(51) Int. Cl.
*H04N 7/14*    (2006.01)
(52) U.S. Cl. ................ 348/14.08; 348/14.09; 348/14.12
(58) Field of Classification Search .... 348/14.01–14.16; 370/260–261; 709/204–205; 715/753, 772, 715/756
See application file for complete search history.

(56) References Cited

U.S. PATENT DOCUMENTS

| | | | |
|---|---|---|---|
| 5,257,306 | A | 10/1993 | Watanabe |
| 5,382,972 | A | 1/1995 | Kannes |
| 8,139,100 | B2 * | 3/2012 | King et al. .................. 348/14.09 |
| 2006/0170763 | A1 * | 8/2006 | Kawamura et al. ........ 348/14.09 |
| 2007/0263076 | A1 | 11/2007 | Andrews et al. |
| 2008/0246834 | A1 | 10/2008 | Lunde et al. |
| 2010/0165069 | A1 | 7/2010 | Kadono |

FOREIGN PATENT DOCUMENTS

| | | |
|---|---|---|
| EP | 0 516 371 A2 | 12/1992 |
| JP | 06-070039 | 3/1994 |
| JP | 7-46564 | 2/1995 |
| JP | 2001-136501 | 5/2001 |
| JP | 2007-096974 | 4/2007 |
| WO | 2007/123965 A2 | 11/2007 |
| WO | WO 2007-122907 A1 | 11/2007 |
| WO | 2007/140459 A2 | 12/2007 |
| WO | 2008/101117 A1 | 8/2008 |
| WO | WO 2008/115070 A1 | 9/2008 |

OTHER PUBLICATIONS

U.S. Appl. No. 12/636,514, filed Dec. 11, 2009, Hagen, et al.
Extended European Search Report issued May 21, 2012, in Patent Application No. 09819434.3.

* cited by examiner

*Primary Examiner* — Melur Ramakrishnaiah
(74) *Attorney, Agent, or Firm* — Oblon, Spivak, McClelland, Maier & Neustadt, L.L.P.

(57) ABSTRACT

A method, device, and computer-readable-medium are disclosed for processing images during a conference between a plurality of video conferencing terminals. The method uses a processor to input a first image from a first camera at a first video conferencing terminal, a second image from a second camera at a second video conferencing terminal, and a third image from a third camera at a third video conferencing terminal. The processor then generates a first composite image that has the third image inserted at a first position into the second image, and a second composite image that has the third image inserted at a second position into the first image. The first position and the second position are located in horizontally opposite portions of the first composite image and the second composite image, respectively. Further, the first and second composite images are sent to the first and second video conferencing terminals, respectively.

27 Claims, 7 Drawing Sheets

METHOD, DEVICE, AND COMPUTER-READABLE MEDIUM FOR PROCESSING IMAGES DURING VIDEO CONFERENCING

CROSS-REFERENCE TO RELATED APPLICATIONS

The present application claims priority from Norwegian patent application No. 20084201, filed Oct. 7, 2008, the entire subject matter of which is incorporated herein by reference. The present application contains related subject matter to U.S. application Ser. No. 12/561,933, filed Sep. 17, 2009, the entire contents of which is incorporated herein by reference.

BACKGROUND

1. Field of the Invention

The present invention relates in general to the field of video conferencing and telepresence systems. More specifically, the invention relates to a method, a device, and a computer-readable medium for processing images during a conference between a plurality of video conferencing terminals.

2. Description of the Related Art

Conventional videoconferencing systems include a number of endpoints that communicate real-time video, audio, and/or data (often referred to as "duo video") streams over and between various networks such as WAN, LAN, and circuit switched networks.

A number of videoconference systems residing at different sites may participate in the same conference, most often, through one or more Multipoint Control Units (MCU) performing, among other things, switching rate conversion, and transcoding functions to allow the audiovisual terminals to intercommunicate properly. The MCU also allows for aggregate presentation on one display of several end users located at different endpoints.

A compression of multimedia data to be transmitted, as well as a decompression of the multimedia data to be received, takes place in a processor unit conventionally referred to as a "codec" (coder/decoder).

Video conferencing systems presently provide communication between at least two locations for allowing a video conference among participants situated at endpoints at each location. Conventionally, the video conferencing arrangements are provided with one or more cameras. The outputs of those cameras are transmitted along with audio signals to a corresponding plurality of displays at a second location such that the participants at the first location are perceived to be present, or face-to-face, with participants at the second location.

Telepresence systems are enhanced video conference systems. Typically, terminals in telepresence systems have a plurality of large scale displays for life-sized video, often installed in rooms with interiors dedicated to video conferencing, all to create an environment as close to personal face-to-face meetings as possible. Video cameras are often arranged on top of the display screens in order to capture images of the local participants, and are transmitted to corresponding remote video conference sites. The images captured by the plurality of high-definition cameras are usually arranged and displayed so that they generate a non-overlapping and/or contiguous field of view. This is in contrast to traditional so-called "Continuous presence" where the video streams are mixed (e.g., a mosaic) in an MCU from source images at endpoints and displayed together on one display in a screen split (N*M array).

Key factors in achieving a feeling of presence are the ability to see at whom the remote participants are looking, that all the participants are displayed in real life size, and that all displayed participants appear equally sized relative to each other. Another provision for achieving high quality telepresence is that the images of the remote participants are presented to each local participant as undistorted as possible.

In order to obtain this feeling of presence, a set of rules, or a proprietary protocol, is used by the telepresence systems such as that described in U.S. patent application Ser. No. 12/050,004. That set of rules (or protocol) defines e.g. camera positions (pan, tilt zoom), codec connection scheme (which local codec should call which remote codec), etc. In known telepresence systems, the user dials (or selects from a phonebook) the remote telepresence sites (and/or other video endpoints) he/she wishes to join in the conference. When the call is launched, the system decides how and where the different remote sites are displayed on the local displays. This may, for example, depend on call sequence (e.g., in a four-site multi-site call the first called site is displayed on the left screen, the second called site on center screen, and the third called site on right screen), or it may appear to be totally random.

Figure 1:
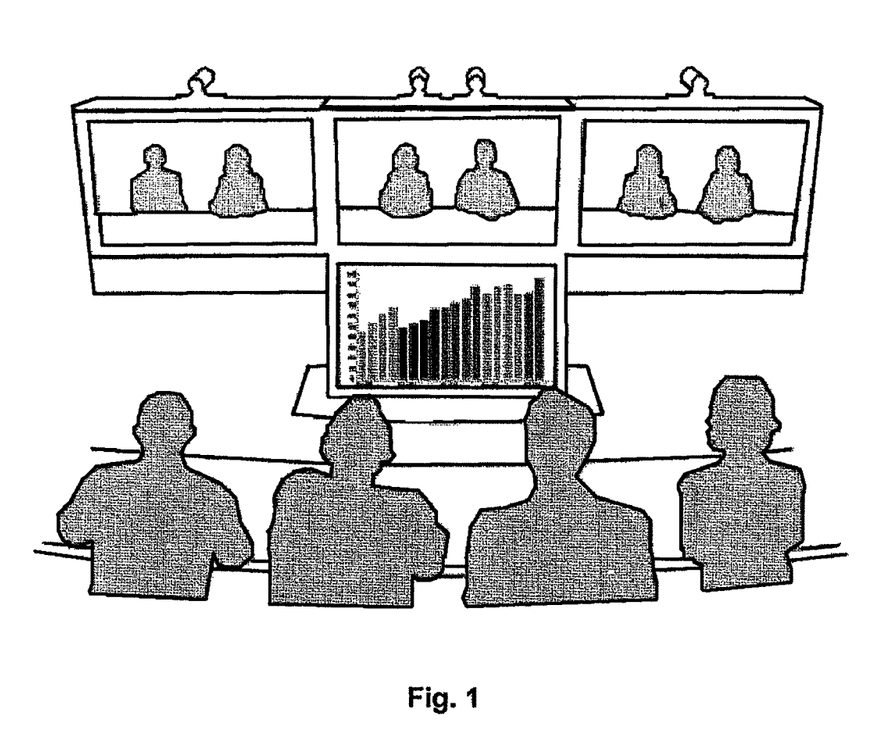
FIG. 1 is a schematic view illustrating some aspects of conventional telepresence video conferencing.

FIG. 1 is a schematic view illustrating some aspects of conventional telepresence video conferencing.

A display device of a video conferencing device, in particular a video conferencing terminal of the telepresence type, is arranged in front of a plurality (in this case, four) of local conference participants. The local participants are located along a table facing the display device, which includes a plurality of display screens. In the illustrated example, four display screens are included in the display device. A first, second, and third display screens are arranged adjacent to each other, as shown in FIG. 1. The first, second, and third display screens are used for displaying images captured at one or more remote conference sites of a corresponding telepresence type.

A fourth display screen is arranged at a central position below the second display screen, as shown in FIG. 1. Generally, the fourth screen may be used for computer-generated presentations or other secondary conference information. Video cameras are arranged on top of the upper display screens in order to capture images of the local participants. The images are then transmitted to corresponding remote video conferencing sites.

A purpose of the setup shown in FIG. 1 is to give the local participants a feeling of actually being present in the same meeting room as the remote participants that are shown on the respective display screens. As mentioned above, in order to obtain the feeling of presence, a set of rules, or a proprietary protocol, is used by the telepresence systems. Therefore, a conventional telepresence system, such as the one shown in FIG. 1, will operate properly only with other telepresence systems supporting that set of rules or protocol. Further, since a standard protocol for telepresence systems has not been defined, only telepresence systems from the same manufacturer may interoperate in a satisfactory way. The present inventors have recognized this as a problem with the conventional system.

In many situations there is a need to call, or receive a call from, a regular video conferencing terminal from a telepresence system, even though the regular video conferencing terminal does not provide the same video and audio quality, real life size display, or eye contact capability. One way of solving this problem is to use a conventional video conferencing codec to handle calls with regular (non-telepresence) video conferencing terminals, and including these calls in the conference by use of the fourth display. As shown in FIG. 1, this fourth screen may be positioned below the second screen. Alternatively, it may be positioned above or next to the collection of displays constituting the telepresence system.

One problem with displaying participants on such a fourth screen is that the feeling of presence is generally lost, or at least reduced. For instance, when the participants at one telepresence site are looking at the fourth screen, it will appear to the participants at the other telepresence sites as if they are looking into the table surface, the ceiling, or the wall. Thus, there is a need for improving the feeling of presence and eye contact in telepresence systems when regular (non-telepresence) video conferencing terminals are included in the conference.

As recognized by the present inventors, another disadvantage of the additional (e.g., fourth) screen is that the conferencing system occupies a significantly larger space in the conference room. Moreover, as the display size of the three main displays increases, there may not be much physical space for an additional screen.

SUMMARY

One aspect of the present invention is to address and resolve the above limitations with conventional systems, methods, and computer-readable mediums.

In an example embodiment, a method for processing images during a conference between a plurality of video conferencing terminals uses a first image from a first camera at a first video conferencing terminal, a second image from a second camera at a second video conferencing terminal, and a third image from a third camera at a third video conferencing terminal. Next, a processor generates a first composite image that has the third image inserted at a first position into the second image. The processor also generates a second composite image that has the third image inserted at a second position into the first image. The first position and the second position are located in horizontally opposite portions of the first composite image and the second composite image, respectively. The first composite image and the second composite image are then sent to the first video conferencing terminal and the second video conferencing terminal, respectively.

As should be apparent, a number of advantageous features and benefits are available by way of the disclosed embodiments and extensions thereof. It is to be understood that any embodiment can be constructed to include one or more features or benefits of embodiments disclosed herein, but not others. Accordingly, it is to be understood that the embodiments discussed herein are provided as examples and are not to be construed as limiting, particularly since embodiments can be formed to practice the invention that do not include each of the features of the disclosed examples.

BRIEF DESCRIPTION OF THE DRAWINGS

The invention will be better understood from reading the description which follows and from examining the accompanying figures. These are provided solely as non-limiting examples of embodiments. In the drawings.

DETAILED DESCRIPTION

Reference will now be made in detail to the present embodiments of the invention, examples of which are illustrated in the accompanying drawings. Wherever possible, the same reference characters will be used throughout the drawings to refer to the same or like parts.

Figure 2:
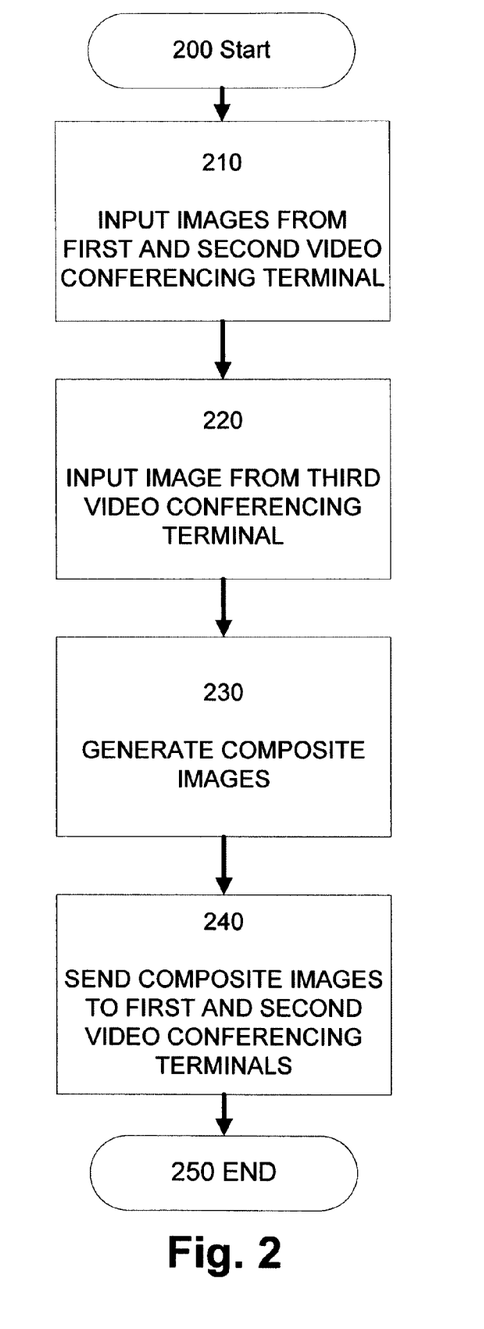
FIG. 2 is a schematic flow chart for processing images during a video conference.

FIG. 2 is a schematic flow chart illustrating the principles of a method for processing images during a conference between a plurality of video conferencing terminals. The method starts at the initiating step 200.

First, in step 210, images are input to a computer, processor, or the like from at least two video conference terminals. A first image is input to a processor, for example, from a first camera at a first video conferencing terminal, and a second image is input to a processor from a second camera at a second video conferencing terminal. The first and second video conferencing terminals may be of a primary type, such as telepresence terminals. The first and second images may be referred to as primary images, reflecting that they originate from a video conferencing terminal of a primary type, such as telepresence terminals. Images may also be provided from cameras at additional video conferencing terminals of the primary type.

Next, in step 220, an image is input to a processor, for example, from a third camera at a third video conferencing terminal. This video conferencing terminal may be of a secondary type. In an embodiment, the at least one video conferencing terminal of a secondary type may be a non-telepresence terminal, for example a regular H.323 terminal. Alternatively, the third telepresence terminal may be operating on H.164, Session Initiated Protocol (SIP), Interactive Connectivity Establishment (ICE), or a standard video conferencing protocol. The third image may be referred to as a secondary image, reflecting that it originates from a regular video conferencing terminal, i.e., a secondary, non-telepresence terminal. Images may also be inputted to a processor from cameras located at additional video conference terminals of the secondary type.

The first, second, and third images (i.e., primary and secondary images) may be included, incorporated, or embedded in video signals. Although the first and second images (primary images or primary video signals) originate from the first and second video conferencing terminals respectively, they may, in practice, be inputted via intermediate additional video conferencing equipment and/or network devices. The primary images, or video signals, may be, for example, read from appropriate circuitry such as a codec included in a video conferencing device, such as a video conferencing endpoint or a Multipoint Control Unit (MCU). Additional primary images or video signals may be provided from other sources such as a camera, a Digital Versatile Disc or Digital Video Disc (DVD) player, a personal computer, a personal digital assistant (PDA), a portable media player, a smartphone, or the like.

Although the third image (secondary image or secondary video signal) originates from the third video conferencing terminals, it may, in practice, be provided via intermediate additional video conferencing equipment and/or network devices. The secondary image, or video signal, may be, for example, read from appropriate circuitry such as a codec included in a video conferencing device, such as a video conferencing endpoint or an MCU. Additional secondary images or video signals may be provided from other sources such as a camera, a DVD player, a personal computer, a PDA, a portable media player, a smartphone, or the like.

In an embodiment, the third image may originate from one source. In another embodiment, the third image may be a composite image from two or more sources, such as a continuous presence image of two video conferencing terminals.

In an embodiment, the steps 210 and 220 of inputting the first, second, and third images may be performed at the first video conferencing terminal. In another embodiment, the steps 210 and 220 of inputting the first, second, and third images may be performed at an MCU.

Next, in the generating step 230, composite images are generated. The generating of composite images may be done with a computer, processor, or the like. Specifically, in step 230, a first composite image is generated, wherein the generating includes inserting the third image (i.e., the image provided from the camera at the third, non-telepresence terminal) at a first position into the second image (i.e., the image provided from a second camera at the second video conferencing terminal). Further in step 230, a second composite image is generated, wherein the generating includes inserting the third image (i.e., the image provided from the camera at the third, non-telepresence terminal) at a second position into the first image (i.e., the image provided from a first camera at the first video conferencing terminal). Note, an image which is inserted into another image may also be referred to as a picture-in-picture (PIP).

In the generating step 230, the first and the second positions are located in horizontally opposite portions of the first and second composite images, respectively. Thus, when a conference participant at the first conference terminal is looking at the inserted third image (i.e., the image originating from the regular, non-telepresence terminal) in the right-hand side of the display screen, that participant will appear to be looking at the opposite side of the display (i.e., the left-hand side of the display) when an image is captured by a camera and displayed on the second conference terminal.

Hence, when user A, at the first or second video conferencing terminal, is talking to (and looking at) user B at the third terminal, the users at the opposite (second or first, respectively) video conferencing terminal intuitively and/or instinctively understand whom user A and user B are addressing because the positions of the third image generate a natural-like environment. As a result, the feeling of presence of the users of the first and second video conferencing terminals is improved even in the case where a regular video conferencing terminal is included in the conference.

With the present embodiment, the need for a space-demanding extra display screen (the fourth screen in the example in FIG. 1) is overcome or reduced. More specifically, in step 230, the first composite image may be generated by inserting the third image in a right-hand position of the second image, and the second composite image may be generated by inserting the third image in a left-hand position of the first image. The third image may be positioned at the right half of the first image, while the third image may also be positioned at the left half of the second image. Furthermore, the third image may be positioned at the same position on opposite sides of a dividing vertical center axis in the first and second images. The third image may also be positioned at the bottom half of the first and second images.

In the generating step 230, the insertion of a third image into the first or second composite image may further involve a resizing of the third image before it is inserted into the first or second image. More particularly, the resizing may involve a downscaling of the third image. The resizing may include, for example, downsizing to a predefined size/format, downsizing with a predefined ratio, resizing in accordance with predefined rules, or any other type of downsizing or resizing technique. For example, the third image may be resized in order to obtain a size which is less than or equal to a quarter of the total area of the first and second images.

In an embodiment, the step 230 of generating the first and second composite images is performed at the first video conferencing terminal. In another embodiment, the step 230 of generating, with a processor, the first and second composite images is performed at an MCU. Furthermore, the processor used to generate may be part of a telepresence endpoint.

Further, in step 240, the first composite image is sent or transmitted to the first video conferencing terminal. Also, in step 240, the second composite image is sent or transmitted to the second video conferencing terminal. In an embodiment, step 240 may further comprise displaying the first composite image on a display of the first video conferencing terminal, and displaying the second composite image on a display of the second video conferencing terminal.

In an embodiment, at least one of the first and second video conferencing terminals is a telepresence terminal. However, both the first and second video conferencing terminals may be telepresence terminals.

Further, it is to be noted that the present disclosure is not limited to a certain number of images or video conferencing terminals. Specifically, the method, device, and computer-readable medium of the present disclosure may be applied to additional images (fourth image, fifth image, sixth image, etc.) from additional video conferencing terminals (fourth video conferencing terminal, fifth video conferencing terminal, sixth video conferencing terminal, etc.) without departing from the scope of the invention.

A video conferencing device or apparatus may be configured to perform the method described in the present disclosure. Such a video conferencing device may, for example, include a video conferencing terminal, a telepresence terminal, a multipoint control unit, or the like.

Further possible aspects of the method will now be illustrated by way of examples. In the following, a number of different modes of operation and constellation of the systems and arrangements will be described.

Figure 3:
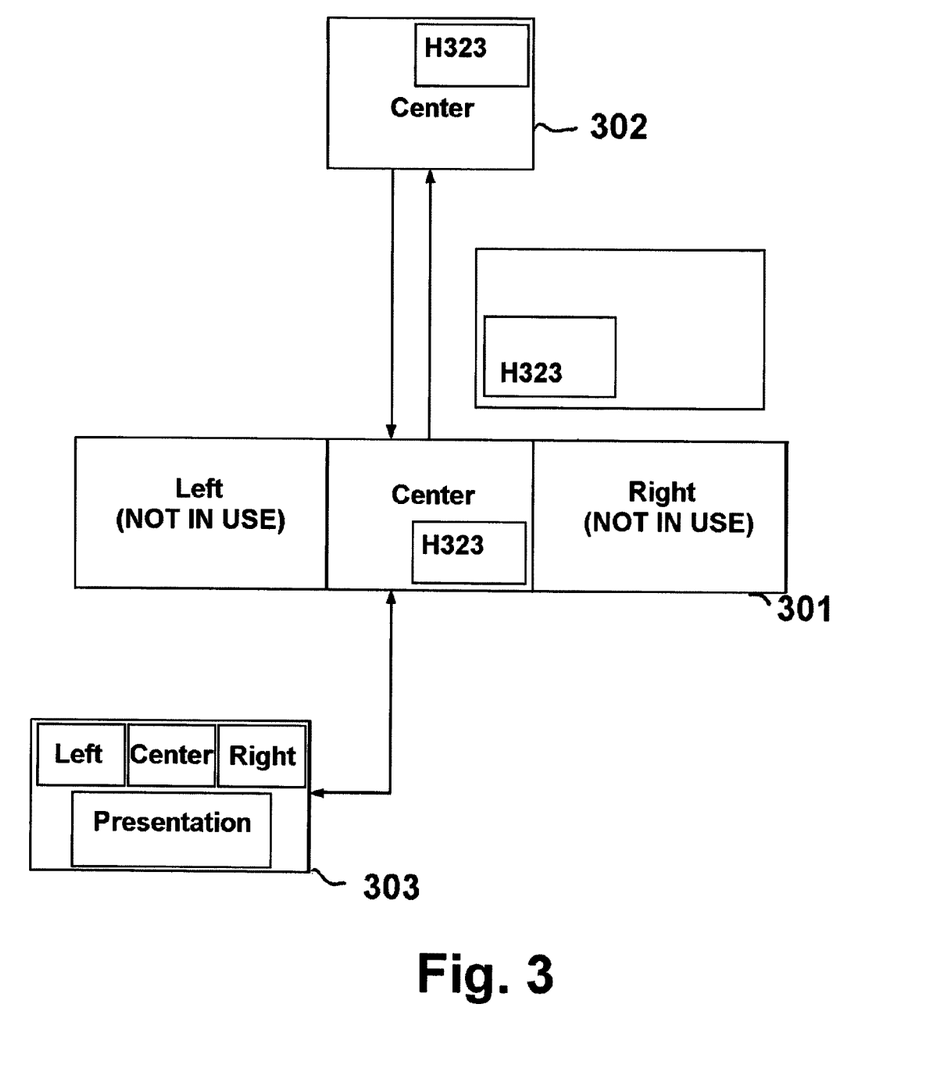
FIGS. 3, 4, and 5 are block diagram example embodiments of a system implementing a method for processing images during a video conference.

FIG. 3 illustrates an example embodiment wherein the first video conferencing terminal is a telepresence terminal 301 and the second video conference terminal is a regular (non-telepresence) video conferencing terminal 302. For simplicity, only the center part (i.e., the center codec) of the telepresence terminal 301 is used in this example. Note, the left part and the right part are not in use.

A first image is inputted to a computer, processor, or the like from a first camera at the first video conferencing terminal 301, and a second image is inputted to a processor from a second camera at the second video conferencing terminal 302. In this exemplary case, the inputting of the images is performed by the first video conferencing terminal 301. Further, a third image is inputted to a processor from a third camera at the third, regular (non-telepresence) video conferencing terminal 303.

A first composite image is generated, with a processor. The first composite image has the third image inserted at a first position (at the bottom right) into the second image. A second composite image is also generated with the use of a processor. The second composite image has the third image inserted at a second position (at the bottom left) into the first image. The first composite image is sent to the first video conferencing terminal 301, and the second composite image is sent to the second video conferencing terminal 302. The first composite image and the second composite image may be displayed on the first video conferencing terminal 301 and the second video conferencing terminal 302, respectively.

Figure 4:
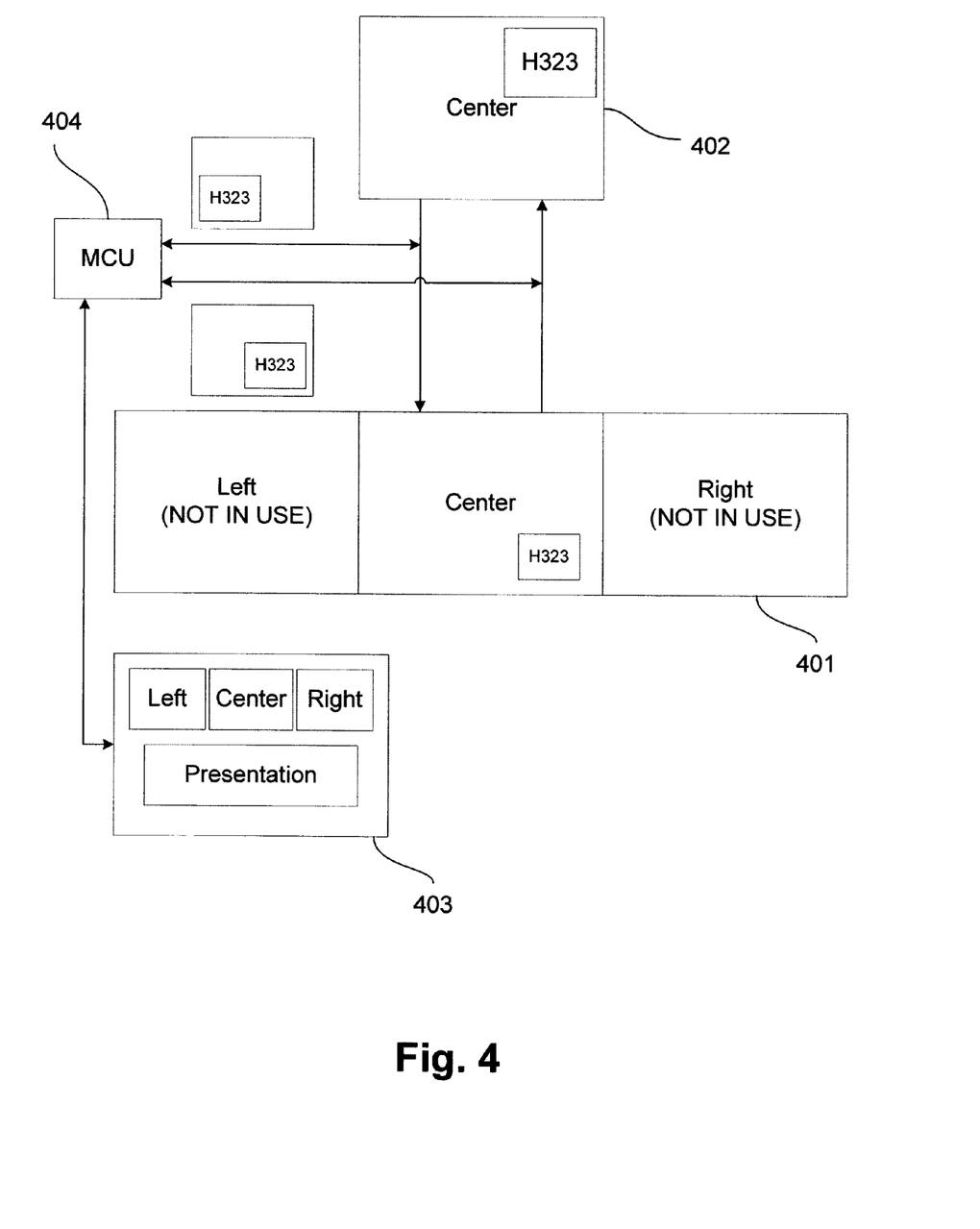

FIG. 4 illustrates an example embodiment wherein the first 401 and second 402 video conferencing terminals are telepresence terminals. The second video conferencing terminal 402 may alternatively be a regular (non-telepresence) video conferencing terminal. An MCU 404 is communicatively connected to the first 401 and second 402 video conferencing terminals, and is configured to perform switching and mixing functions to allow proper intercommunication between terminals.

For simplicity, only the center part (i.e., the center codec) of the telepresence terminal 401 is used in this example. Note, the left part and the right part are not in use. A first image is inputted by a processor from a first camera at the first video conferencing terminal 401, and a second image is inputted by a processor from a second camera at the second video conferencing terminal 402. In this example, the inputting of the images is performed by the MCU 404. Further, a third image is inputted by a processor from a third camera at the third, regular (non-telepresence) video conferencing terminal 403. The third video conferencing terminal 403 is also communicatively connected to the MCU 404.

In this embodiment, the first, second, and third images are provided by the MCU 404. Also, the generating of a first composite image, including inserting the third image at a first position (at the bottom right) into the second image, is performed by the MCU 404. Also, the generating of a second composite image, including inserting the third image at a second position (at the bottom left) into said first image, is performed by the MCU 404.

The first composite image is sent, in this case by the MCU 404, to the first video conferencing terminal 401, and the second composite image is sent by the MCU 404, to the second video conferencing terminal 402. The first composite image and the second composite image may then be displayed on the first video conferencing terminal 401 and the second video conferencing terminal 402, respectively.

Figure 5:
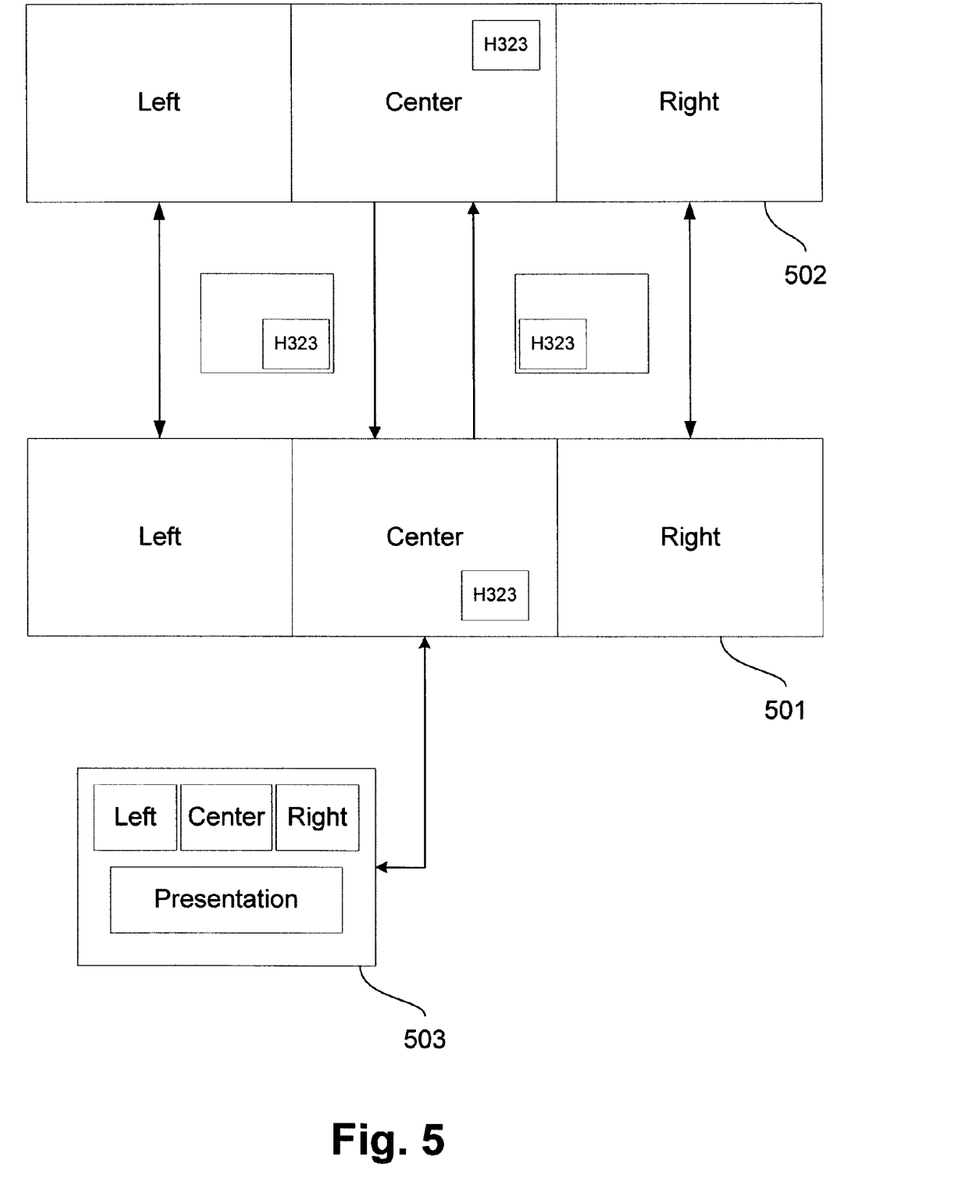

FIG. 5 illustrates an example embodiment wherein the first 501 and the second 502 video conferencing terminals are both telepresence terminals. Both the left, the center, and the right parts (i.e., left, center, and right codecs) of the telepresence terminals 501 and 502 are used in this example.

A first image is inputted to a processor from a first camera at the center part of the first video conferencing terminal 501, and a second image is inputted to a processor from a second camera at the center part of the second video conferencing terminal 502. The inputting of the images is performed by the first video conferencing (telepresence) terminal 501 in this exemplary case. Further, a third image is inputted to a processor from a third camera at the third, regular (non-telepresence) video conferencing terminal 503.

A first composite image is generated with the use of a processor. The first composite image has the third image inserted at a first position (at the bottom right) into the second image. A second composite image is also generated with the use of a processor. The second composite image has the third image inserted at a second position (at the bottom left) into the first image. The first composite image is sent or transmitted to the first video conferencing terminal 501. The first composite image may then be displayed on the first video conferencing terminal 501. The second composite image is sent to the second video conferencing terminal 502, where it may also be displayed. In addition, as illustrated, the left part of the first video conferencing terminal 501 is communicatively connected to the right part of the second video conferencing terminal 502, and vice versa.

Figure 6:
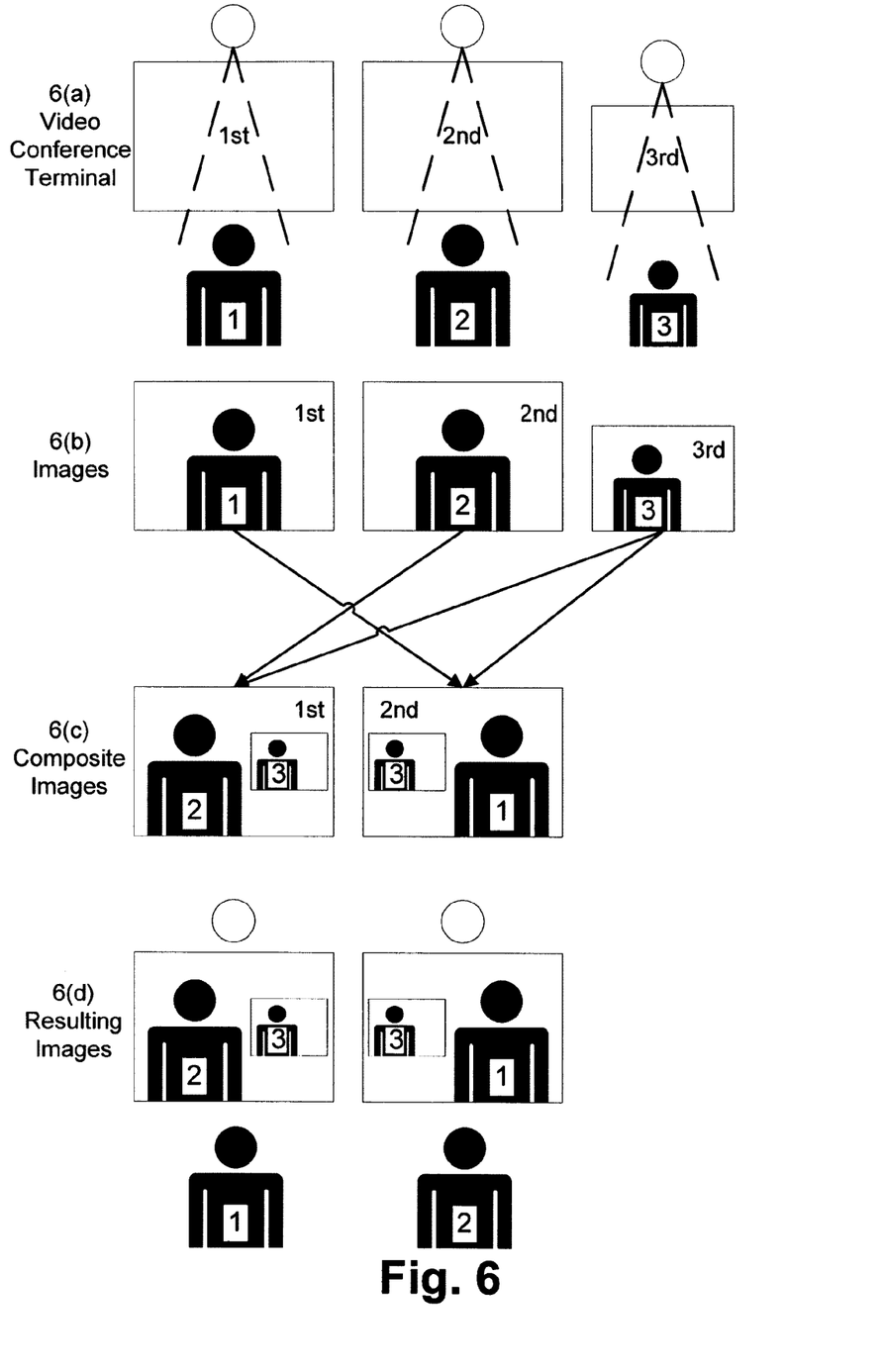
FIG. 6 is a schematic diagram further illustrating a method for processing images during a video conference.

FIG. 6 further illustrates principles and results of the method. The upper (first) line (6a) in FIG. 6 illustrates first, second, and third video conferencing terminals. The first and second terminals may be telepresence terminals, while the third terminal may be a regular video conferencing terminal. For simplicity, only one user has been shown at each of the first, second, and third video conferencing terminals. It is to be understood by those skilled in the art that in the present disclosure, any number of users may be present, simultaneously, at any given terminal.

At the first video conferencing terminal, the camera captures an image of the first user. At the second video conferencing terminal, the camera captures an image of the second user. At the third video conferencing terminal, the camera captures an image of the third user. The resulting images (the first, second, and third images, respectively) are illustrated in the second line (6b) of FIG. 6.

Next, a first composite image is generated, shown to the left in the third line (6c) in FIG. 6. As can be seen, the first composite image has been generated by inserting the third image (the image of the third user) at a first position into the second image (the image of the second user). Also, a second composite image is generated, shown to the right in the third line (6c) in FIG. 6. The second composite image has been generated by inserting the third image (the image of the third user) at a second position into the first image (the image of the second user). The composite images in line (6c) also show that the first and second positions (the positions of the third, inserted image) are located in horizontally opposite portions of the first and second composite images. More specifically, the third image has been positioned in the lower right-hand part of the first composite image, while it has been positioned in the lower left-hand part of the second composite image.

The first composite image is further sent or transmitted to the first video conferencing terminal, where a first video conferencing terminal displaying unit (for example, a touch panel display, liquid crystal display (LCD), or the like) may display the image. The resulting view of the first user has been illustrated to the left in the fourth line (6d) in FIG. 6. The second composite image is sent to the second video conferencing terminal, where a second video conferencing terminal displaying unit (for example, a touch panel display, liquid crystal display (LCD), or the like) may display the image. The resulting view of the second user has been illustrated to the right in the fourth line (6d) in FIG. 6.

As will be understood from these resulting views, the first user, when addressing the third user at the first video conferencing terminal, will look to the right. This will be observed and perceived in a natural way by the second user at the second video conferencing terminal, since the first user, as he or she appears on the second terminal display screen, looks in the direction towards the image of the third user. Thus, a natural feeling of presence may be perceived by all users regardless of where the video conferencing terminals are geographically located.

Figure 7:
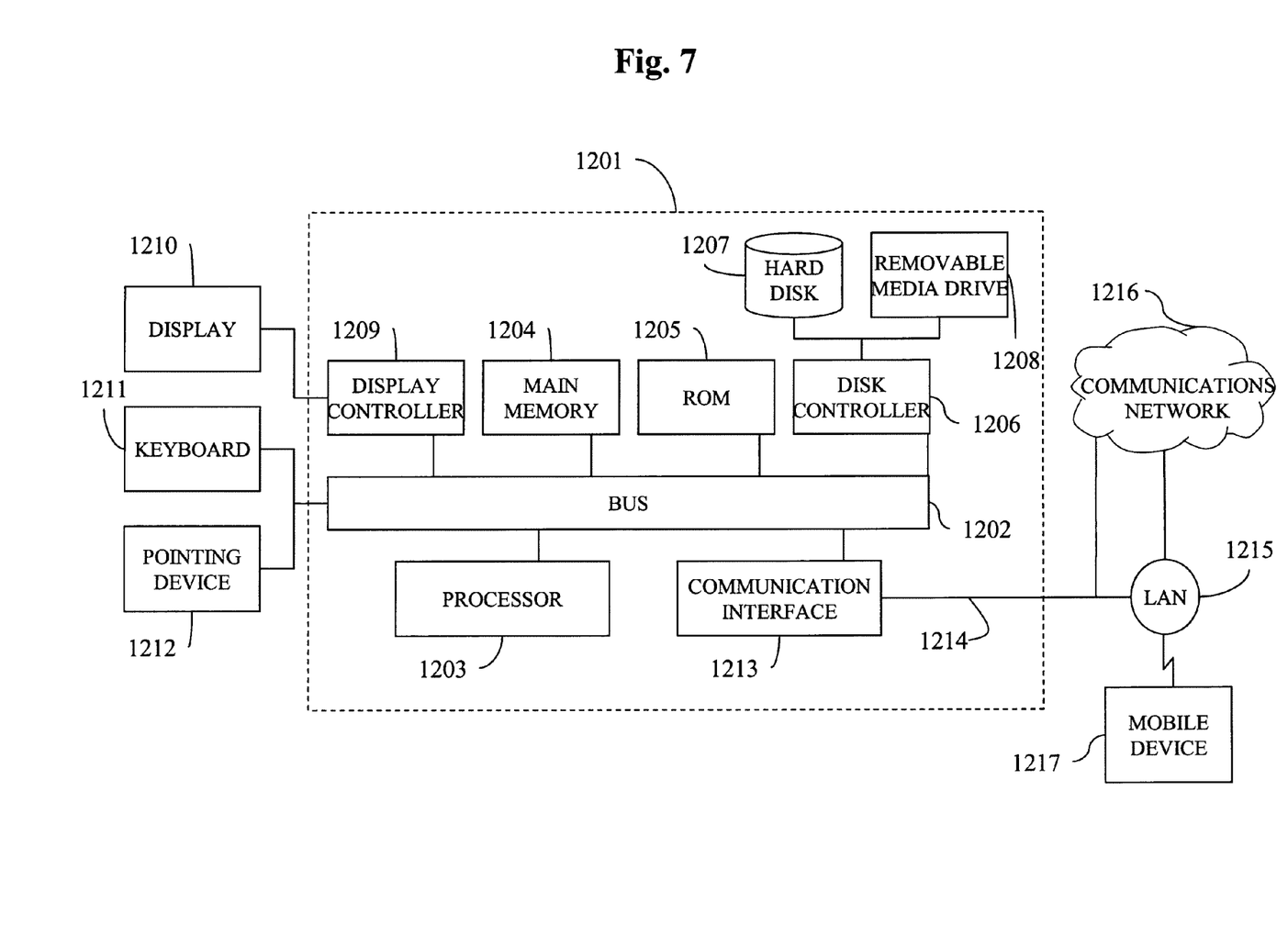
FIG. 7 illustrates a computer system upon which an embodiment of the present disclosure may be implemented.

FIG. 7 illustrates a computer system 1201 upon which an embodiment of the video conferencing device or apparatus, according to the present embodiments, may be implemented. The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a touch panel display or a liquid crystal display (LCD), for displaying information to a computer user. The computer system includes input devices, such as a keyboard 1211 and a pointing device 1212, for interacting with a computer user and providing information to the processor 1203. The pointing device 1212, for example, may be a mouse, a trackball, a finger for a touch screen sensor, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

Further, it should be appreciated that the exemplary embodiments of the invention are not limited to the exemplary embodiments shown and described above. While this invention has been described in conjunction with exemplary embodiments outlined above, various alternatives, modifications, variations and/or improvements, whether known or that are, or may be, presently unforeseen, may become apparent. Accordingly, the exemplary embodiments of the invention, as set forth above are intended to be illustrative, not limiting. The various changes may be made without departing from the spirit and scope of the invention. Therefore, the systems and methods according to exemplary embodiments of this invention are intended to embrace all now known or later-developed alternatives, modifications, variations and/or improvements.

The invention claimed is:

1. A method for processing images during a conference between a plurality of video conferencing terminals, the method comprising:
   inputting to a processor a first image from a first camera at a first video conferencing terminal;
   inputting to the processor a second image from a second camera at a second video conferencing terminal;
   inputting to the processor a third image from a third camera at a third video conferencing terminal;
   generating, with the processor, a first composite image that has the third image inserted at a first position into the second image;
   generating, with the processor, a second composite image that has the third image inserted at a second position into the first image,
   wherein the first position and the second position are located in horizontally opposite portions of the first composite image and the second composite image, respectively;
   sending the first composite image to the first video conferencing terminal; and
   sending the second composite image to the second video conferencing terminal.

2. The method according to claim 1, wherein the generating, with the processor, a first composite image includes generating the first composite image with a multipoint control unit.

3. The method according to claim 2, wherein the processor is part of a telepresence endpoint.

4. The method according to claim 1, further comprising:
   displaying the first composite image on a display of the first video conferencing terminal; and
   displaying the second composite image on a display of the second video conferencing terminal.

5. The method according to claim 1, wherein the generating, with the processor, the first composite image and the generating, with the processor, the second composite image includes resizing the third image.

6. The method according to claim 5, wherein the resizing includes at least one of downsizing to a predefined size or format and downsizing using a predefined ratio.

7. The method according to claim 1, wherein the inputting to the processor the first image, the inputting to the processor the second image, and the inputting to the processor the third image are performed at the first video conferencing terminal.

8. The method according to claim 1, wherein the inputting to the processor the first image, the inputting to the processor the second image, and the inputting to the processor the third image are performed at a multipoint control unit.

9. The method according to claim 1, wherein the generating, with the processor, the first composite image and the generating, with the processor, the second composite image are performed at the first video conferencing terminal.

10. The method according to claim 1, wherein at least one of the first video conferencing terminal and the second video conferencing terminal is a telepresence terminal.

11. The method according claim 1, wherein the third video conferencing terminal is a regular video conferencing terminal operating on H.164 protocol, H.323 protocol, Session Initiated Protocol (SIP), Interactive Connectivity Establishment (ICE), or a standard video conferencing protocol.

12. The method according claim 1, wherein the first image, the second image, and the third image are included in video signals.

13. The method according claim 1, further comprising inputting to the processor additional images from additional video conferencing terminals.

14. A video conferencing device for processing images during a conference between a plurality of video conferencing terminals, the device comprising:
   an interface that receives
      a first image from a first camera at a first video conferencing terminal,
      a second image from a second camera at a second video conferencing terminal, and
      a third image from a third camera at a third video conferencing terminal;
   a processor configured to generate
      a first composite image that has the third image inserted at a first position into the second image, and
      a second composite image that has the third image inserted at a second position into the first image, wherein the first position and the second position are located in horizontally opposite portions of the first composite image and the second composite image, respectively; and
   a sending unit that sends the first composite image to the first video conferencing terminal and the second composite image to the second video conferencing terminal.

15. The video conferencing device according to claim 14, wherein the processor is configured to generate the first composite image and the second composite image and generates at least one of the first composite image and the second composite image with a multipoint control unit.

16. The video conferencing device according to claim 15, wherein the processor is part of a telepresence endpoint.

17. The video conferencing device according to claim 14, further comprising:

a first video conferencing terminal displaying unit configured to display the first composite image; and
a second video conferencing terminal displaying unit configured to display the second composite image.

18. The video conferencing device according to claim 14, wherein the processor resizes the third image to generate the first composite image and the second composite image.

19. The video conferencing device according to claim 18, wherein the processor resizes the third image by at least one of downsizing to a predefined size or format and downsizing using a predefined ratio.

20. The video conferencing device according to claim 14, wherein the first image, the second image, and the third image are captured at the first video conferencing terminal.

21. The video conferencing device according to claim 14, wherein the first composite image and the second composite image are processed at a multipoint control unit.

22. The video conferencing device according to claim 14, wherein at least one of the first video conferencing terminal and the second video conferencing terminal is a telepresence terminal.

23. The video conferencing device according claim 14, wherein the third video conferencing terminal is a regular video conferencing terminal operating on H.164 protocol, H.323 protocol, Session Initiated Protocol (SIP), Interactive Connectivity Establishment (ICE), or a standard video conferencing protocol.

24. The video conferencing device according claim 14, wherein the first image, the second image, and the third image are included in video signals.

25. The video conferencing device according claim 14, wherein the interface receives additional images from additional video conferencing terminals.

26. The video conferencing device according to claim 14, including at least one of a telepresence terminal and a multipoint control unit.

27. A non-transitory computer-readable medium including computer executable instructions, wherein the instructions, when executed by a processor, cause the processor to perform a method, the method comprising:
inputting to the processor a first image from a first camera at a first video conferencing terminal;
inputting to the processor a second image from a second camera at a second video conferencing terminal;
inputting to the processor a third image from a third camera at a third video conferencing terminal;
generating, with the processor, a first composite image that has the third image inserted at a first position into the second image;
generating, with the processor, a second composite image that has the third image inserted at a second position into the first image,
wherein the first position and the second position are located in horizontally opposite portions of the first composite image and the second composite image, respectively;
sending the first composite image to the first video conferencing terminal; and
sending the second composite image to the second video conferencing terminal.

* * * * *